N. Comstock,
Automatic Gate,

N°. 52,682.                  Patented Feb. 20. 1866

Witnesses:
Theo Busch.
Wm B Carlton.

Inventor.
N. Comstock.
By Munn & Co
atty.

UNITED STATES PATENT OFFICE.

NORMAN COMSTOCK, OF WESTFIELD, ILLINOIS.

IMPROVEMENT IN SELF-OPERATING GATES.

Specification forming part of Letters Patent No. 52,682, dated February 20, 1866.

*To all whom it may concern:*

Be it known that I, NORMAN COMSTOCK, of Westfield, in the county of Clark and State of Illinois, have invented a new and Improved Self-Operating Gate; and I do hereby declare that the following is a full, clear, and exact description thereof, which will enable those skilled in the art to make and use the same, reference being had to the accompanying drawings, forming part of this specification.

Figure 1:
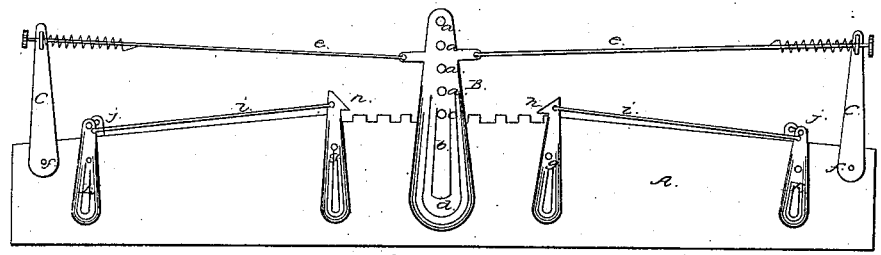
Figure 2:
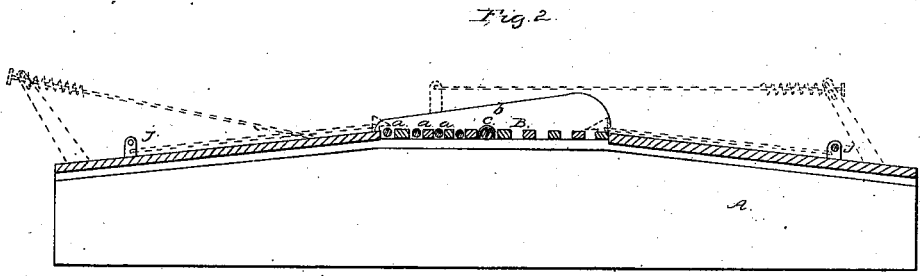

Figure 1 is a side view of my invention; Fig. 2, a side sectional view of the same.

Similar letters of reference indicate corresponding parts.

This invention relates to a new and improved gate of that class designed for opening and closing without the trouble of getting out of a vehicle, or without dismounting from a horse.

A represents a box, constructed of either metal or wood and fitted in the roadway or other place where it is desired to have the gate.

The gate represented by B may be constructed of a series of horizontal bars, $a$, connected to bars $b\ b$, attached to a rod or shaft, $c$, which works in bearings on the top of box B, the bars $b\ b$ extending down some distance below the shaft $c$, and having weights $d$ at their lower ends, which serve to keep the gate in an upright position or closed.

The top of the box has a series of transverse slots made in it to receive the bars $a$ of the gate when the latter is turned down or opened, so that a vehicle may pass over without breaking or injuring the bars, as will be fully understood by referring to Fig. 2.

The gate is counterposed, so that it may be turned down without a very great effort on the part of the operator.

One of the bars $b$ of the gate is connected, by rods $e$, to arms $c\ c$, the lever ends of which are connected by pivots $f$, one to each end of the box A, at one side of the same, and to the same side of the box there are attached, by pivots $g\ g$, two arms, D D, formed with catches $h$ at their upper ends to catch over the top bar, $a$, of the gate and hold the same down or open.

The arms D D at their upper ends are connected, by rods $i'\ i'$, with pivoted arms E E, attached to both sides of the box A, two at each side, and these arms E at each side of gate B are connected by a rod, $j$.

The operation is as follows: Suppose a vehicle to be approaching the upright or closed gate from either direction, the driver guides the team in such a manner as to cause the hub of a wheel of the vehicle to strike the arm C in front of him, thereby forcing or tilting said arm forward and causing the gate to be turned down or opened, in which position it is held by one of the catches $h$, to admit of the vehicle passing over it. The vehicle after passing over or through the gate necessarily passes over a rod, $y'$, connecting two of the arms E, the weight of the vehicle depressing said rod and turning the arms E, which, in consequence of being connected to the arms D by the rods $i$, actuate the catches holding down the gate, so that the latter will be released and brought to an upright closed state under the gravity of the weight $d$. Thus by this simple arrangement a self-operating or self-adjusting gate is obtained—one not liable to get out of repair, or become deranged by use, or liable to be casually opened by the wind or by stock.

Having thus described my invention, I claim as new and desire to secure by Letters Patent—

The combination and arrangement of the gate B, arms C D E, catches $h$, and rods $j$, as and for the purpose specified.

NORMAN COMSTOCK.

Witnesses:
WM. H. DE LONG,
WILLIAM KING.